United States Patent
Kawase et al.

(10) Patent No.: US 6,697,186 B2
(45) Date of Patent: Feb. 24, 2004

(54) METHOD AND APPARATUS FOR GENERATING TERA-HERTZ WAVE

(75) Inventors: Koda Kawase, Miyagi (JP); Hiromasa Ito, Miyagi (JP); Jun-ichi Shikata, Miyagi (JP)

(73) Assignee: Riken, Saitama (JP)

( * ) Notice: Subject to any disclaimer, the term of this patent is extended or adjusted under 35 U.S.C. 154(b) by 212 days.

(21) Appl. No.: 09/933,085

(22) Filed: Aug. 21, 2001

(65) Prior Publication Data

US 2002/0024718 A1 Feb. 28, 2002

(30) Foreign Application Priority Data

Aug. 30, 2000 (JP) ........................ 2000-261233

(51) Int. Cl.$^7$ .............................. G02F 1/39; G02F 1/35
(52) U.S. Cl. ........................................ 359/330; 359/326
(58) Field of Search ................... 359/326–332

(56) References Cited

U.S. PATENT DOCUMENTS 5,543,960 A * 8/1996 Carrig et al. ................ 359/326

FOREIGN PATENT DOCUMENTS

| JP | 9-146131 A | | 6/1997 | |
|----|------------|---|--------|---|
| JP | 2002-72269 | * | 3/2002 | ............. G02F/1/39 |
| JP | 2003-5238  | * | 1/2003 | ............. G02F/1/39 |

OTHER PUBLICATIONS

Kodo Kawase et al., "Unidirectional radiation of widely tunable THz wave using a prism coupler noncollinear phase matching condition," Appl. Phys. Lett. 71 (6), Aug. 11, 1997 (American Institute of Physics, 1997), pp. 753–755.

Kodo Kawase et al., "Tunable Terahertz–Wave Generation by Parametric Oscillation and Its Application," The Review of Laser Engineering, vol. 26, No. 7, Jul. 1998, pp. 522–526 (The Laser Society of Japan).

Ken–Ichi Karino et al., "THz–Wave Parametric Generation Characteristics of MgO:LiNbO3," Denshi Joho Tuushin Gakkai Ronbunshi, Apr. 2000, vol. J38–C, No. 4, pp. 268–275.

* cited by examiner

*Primary Examiner*—John D. Lee
(74) *Attorney, Agent, or Firm*—Griffin & Szipl

(57) ABSTRACT

A THz-wave generator according to the present invention includes a nonlinear optical crystal 1 capable of parametric generation, a first laser device 12 for injecting a single-frequency first laser beam 7 as a pump wave into the nonlinear optical crystal, and a second laser device 14 for injecting a different single-frequency second laser beam 8 to thereby injection-seed a second laser beam 8 in a direction in which an idler wave is generated by the pump wave. By this configuration, it is possible, in generation of a THz-wave by use of the parametric effect in the nonlinear optical crystal under a non-collinear phase matching condition, to greatly increase a power of the THz-wave, to narrow its spectrum width, to make variable the wavelength of a generated THz-wave, and to hold its generation direction almost constant.

9 Claims, 6 Drawing Sheets

METHOD AND APPARATUS FOR GENERATING TERA-HERTZ WAVE

BACKGROUND OF THE INVENTION

1. Field of the Invention

The present invention relates to a method and an apparatus for generating a tera-Hertz (THz) wave.

2. Description of the Related Art

A region of a far-infrared radiation or a sub-millimeter wave is positioned at a light wave-radio wave interface and so its field has been left undeveloped both in technology and application in contrast to the light wave and the radio wave, which have been developed in their own fields. This field of far-infrared radiation or sub-millimeter wave, however, has been more and more important in effective utilization of a frequency band in wireless communications, accommodation of ultra-high communications, environmental measurement by use of imaging or tomography utilizing properties of an electromagnetic wave in such a frequency band, and application to biology and medicine. Hereinafter, a far-infrared radiation and a sub-millimeter wave is called a "THz-wave" or "Tera-Hertz Wave".

A THz-wave is difficult both to generate and to detect and in fact has been generated conventionally by use of (A) free-electron laser, (B) backward oscillator (BWO), (C) p-Ge laser, etc.

A free-electron laser is, in principle, capable of generating any wavelength of THz-wave but requires a long electronic bunch for its oscillation near 1 THz to result in a large-sized device measuring 10 meters or so, thus having a problem that is not only expensive but also inconvenient in use.

A BWO is excellent in its spectrum purity and useful in a band of several hundred GHz but has a problem of a rapid decrease in its tunability at a frequency higher than 1 THz.

A p-Ge laser requires for its operation an extreme low temperature, which needs cooling by use of liquid helium.

Those prior art THz-wave generating means, therefore, can be used in a laboratory but are all large sized and expensive or often inconvenient in use, so that they have not been practical or simple enough to meet the needs in a variety of researches for application.

To solve those problems of the above-mentioned prior art THz-wave generating means, there is reported in the following references by the present inventor et al. such a room-temperature THz-wave generating means that has tunability in a band of 1–2 THz and that can operate in a small-sized laser device:

Reference 1: Japan Patent Publication Laid-Open No. 9-146131.

Reference 2: Unidirectional radiation of widely tunable THz-wave using a prism coupler under non-collinear phase matching condition, 1997 American Institute of Physic, Aug. 11, 1997.

Reference 3: Tunable Terahertz-Wave Generation by Parametric Oscillation and Its Application, The Review of Laser Engineering, July 1998.

Reference 4: The THz-wave Parametric Generation Characteristics of $MgO:LiNbO_3$, The Transactions of the Institute of Electronics, Information and Communication Engineers, April 2000.

FIG. 1 is an illustration for showing a principle for generating the THz-wave. In the figure, a reference numeral 1 indicates nonlinear optical crystal (e.g., $LiNbO_3$), a reference numeral 2 indicates a pump wave (e.g., YAG laser), a reference numeral 3 indicates an idler wave, and a reference numeral 4 indicates a THz-wave.

When a pump wave 2 is infected in a constant direction into a nonlinear optical crystal 1 having Raman activity and far-infrared activity, the induced Raman effect (or parametric interaction) causes an idler wave 3 and a THz-wave 4 to be generated through an elementary excitation wave (polariton) of the material. In this case, the energy conservation law given by Equation 1 and the momentum conservation law (phase matching condition) given by Equation 2 are established among the pump wave 2 ($\omega_p$), the THz-wave 4 ($\omega_T$), and the idler wave 3 ($\omega_i$). Note here that Equation 2 represents a vector relationship and the non-collinear phase matching condition can be expressed as given at the upper right in FIG. 1.

$$\omega_p = \omega_T + \omega_i \quad (1)$$

$$\kappa_p = \kappa_T + \kappa_i \quad (2)$$

Thus generated idler wave 3 and THz-wave 4 have a spatial spread and their wavelengths change continuously according to their emergent angles. The generation of the broad idler wave and THz-wave in this single-path arrangement is called THz-wave parametric generation (TPG).

Note here that a basic optical parametric process is defined as annihilation of one pump photon and simultaneous generation of one idler photon and one signal photon. When an idler wave or a signal light resonate and if the intensity of a pump wave exceeds a constant threshold, parametric oscillation occurs. Moreover, annihilation of one pump photon and simultaneous generation of one idler photon and one polariton are combined to constitute induced Raman scattering, which is included in parametric interaction.

However, a THz-wave generated in a THz-wave generator with such a single-path arrangement as shown in FIG. 1 is very faint and has a problem that its major part is absorbed in a nonlinear optical crystal when it goes through it by several hundred micrometers.

FIG. 2 is a configuration diagram of a THz-wave generator which solves this problem. As shown in it, by arranging a resonator for the idler wave 3 in a specific direction (angle of θ), it is possible to enhance the intensity of the idler wave 3. In this case, the resonator is comprised of mirrors M1 and M2 on which high-reflection coating is applied and is set on a rotary stage 5, thus enabling adjusting the resonator angle finely. Moreover, each of these two mirrors M1 and M2 is high-reflection coated only half of it in surface area so that a pump wave 2 may pass through the remaining surface area. In FIG. 2, a reference numeral 6 indicates a prism coupler for taking a THz-wave 4 out.

In the THz-wave generator shown in FIG. 2, when an incident angle θ of the pump wave upon the crystal is changed over a certain range (e.g., 1–2°), an angle between the pump wave and the idler wave in the crystal is changed, thus changing also an angle between the THz-wave and the idler wave. This change in the phase matching condition provides the THz-wave with continuous tunability in a range of, for example, about 140–310 μm.

As described above, a THz-wave generated in a THz-wave generator having such a single-path arrangement as shown in FIG. 1 is very faint and, in fact, its intensity was only 2 pJ/pulse even when a strong Nd:YAG laser with an excitation intensity of, for example, 45 mJ/pulse was used as the pump wave.

Furthermore, the THz-wave generator having such a resonator as shown in FIG. 2 can indeed enhance the intensity of a generated THz-wave a few times as high as that by the single-path arrangement but with a wider oscillation spectrum (e.g., about 15 GHz), thus finding less practicability in a variety of measurement applications.

Furthermore, this apparatus has a complicated mechanism for driving the rotary stage 5 for rotating the resonator and also a complicated process of adjusting the resonator itself.

SUMMARY OF THE INVENTION

The present invention has been devised to solve those problems. That is, it is an object of the present invention to provide a method and apparatus which can greatly increase the power of a THz-wave generated by parametric generation under a non-collinear phase matching condition in a nonlinear optical crystal and which can narrow a spectrum width of the THz-wave.

It is another object of the present invention to provide a method and apparatus that can provide a variable wavelength of a generated THz-wave and also which can hold its generation direction at mostly constant.

The inventors of the present invention confirmed first in the world such a phenomenon that in parametric generation under a non-collinear phase matching condition in a nonlinear optical crystal, by performing excitation by use of a laser beam of a single frequency and injection-seeding by use of a single-frequency laser beam on a stokes wave (idler wave), a spectrum width of a generated THz-wave can be narrowed down to almost the sum of spectrum widths of the pump wave and the injection-seeded wave, and the power of the THz-wave can be increased greatly. The present invention is dependent on such a novel finding.

That is, the present invention provides a THz-wave generating method by injecting a pump wave (2) into a nonlinear optical crystal (1) capable of parametric generation to thereby generate an idler wave (3) and a THz-wave (4) in such a direction as to satisfy the non-collinear phase matching condition, in which a single-frequency first laser beam (7) is used as the pump wave and another single-frequency second laser beam (8) is injection-seeded in a direction in which the idler wave is generated.

Furthermore, the present invention provides a THz-wave generator comprising a nonlinear optical crystal (1) capable of parametric generation, a first laser device (12) for injecting a single-frequency first laser beam (7) as the pump wave (2) into this nonlinear optical crystal, and a second laser device (14) for injection-seeding another single-frequency second laser beam (8) in a direction in which an idler wave is generated by the pump wave.

According to the method and apparatus of the present invention, another single-frequency second laser beam (8) is injection-seeded using the second laser device (14) in a direction in which the idler wave (3) is generated, thus enabling increasing the intensity of the idler wave in a nonlinear optical crystal than by a method of generating an idler wave only by the parametric interaction. It is experimentally confirmed that this method and apparatus can enhance the optical intensity of the idler wave (3) in this direction and also can greatly enhance the intensity of the generated THz-wave.

Furthermore, it is experimentally confirmed that the idler wave (3) enhanced in intensity by the second laser beam (8) has strong directivity and also both the first laser beam (7) and the second laser beam (8) are of a single frequency, thus enabling not only improving the directivity in the generation direction of the generated THz-wave (4) but also narrowing its spectrum width greatly.

According to a preferred embodiment of the present invention, the second laser device (14) is of a tunable type, by which the wavelength of the second laser beam (8) used in injection-seeding can be changed, thus changing the wavelength of the THz-wave.

According to this method and apparatus, it is also possible to change the wavelength of the THz-wave without rotating the provided rotary stage 5 according to the prior art. Therefore, not only the mechanism can be simplified but also a measuring system employing a THz-wave can be adjusted more easily.

Furthermore, preferably, the apparatus is provided with at least one prism coupler (16) arranged on the nonlinear optical crystal, which prism coupler is made of such a material that has a small variation of refractive index in a THz-wave band to thereby reduce a change in the radiation angle which accompanies a change in the wavelength of the THz-wave.

It was confirmed by analysis that silicon (Si), if employed as the material of the prism coupler, would bring about little change in the radiation angle of a generated THz-wave even when the wavelength of the THz-wave is changed over a range of 150–300 $\mu$m. Therefore, it is possible to fix a direction in which the THz-wave is generated, and to further simplify the measuring system employing a THz-wave.

According to a second embodiment of the present invention, the nonlinear optical crystal (1) has, in configuration, reflection face (1a, 1b) at least partially on its both surfaces, by which faces (1a, 1b) are reflected the first laser beam (7) and the second laser beam (8) to thereby pass through in the nonlinear optical crystal a plurality of times, so that as the first laser beam (7) and the second laser beam (8) are reflected at one end face or both end faces of the nonlinear optical crystal to thereby pass through in the crystal, the power of the THz-wave is enhanced.

Therefore, by this method and apparatus, the first laser beam (7) and the second laser beam (8) can pass through in the same nonlinear optical crystal (1) a plurality of times, to thus intensify the THz-wave generated.

A third embodiment of the present invention comprises the resonator (18) comprised of one pair of mirrors (18a, 18b) which are high-reflection coated, for amplifying the idler wave (3).

According to this configuration, the mirrors (18a, 18b) of the resonator (18) can further intensify the idler wave, thus further increasing the intensity of the THz-wave generated.

The other objects, advantages, and features of the present invention will be more apparent from the following description taken in conjunction with the accompanying drawings.

DESCRIPTION OF THE PREFERRED EMBODIMENTS

Figure 1:
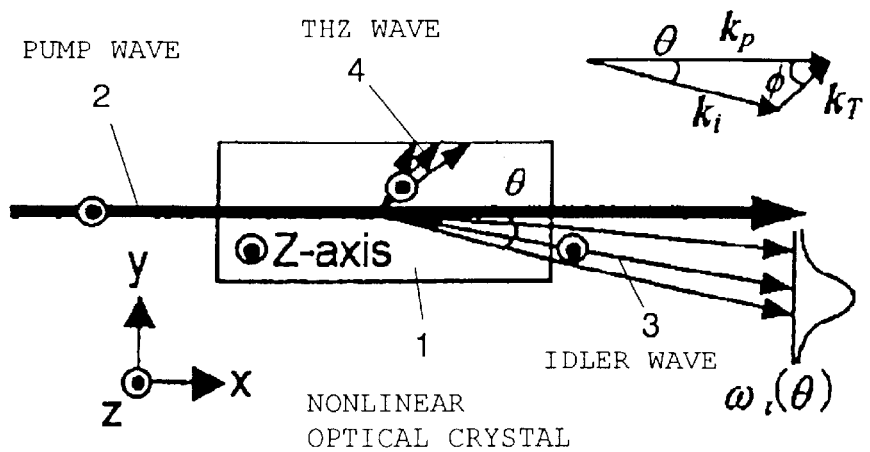
FIG. 1 is an illustration for showing a principle for generating a THz-wave.
Figure 2:
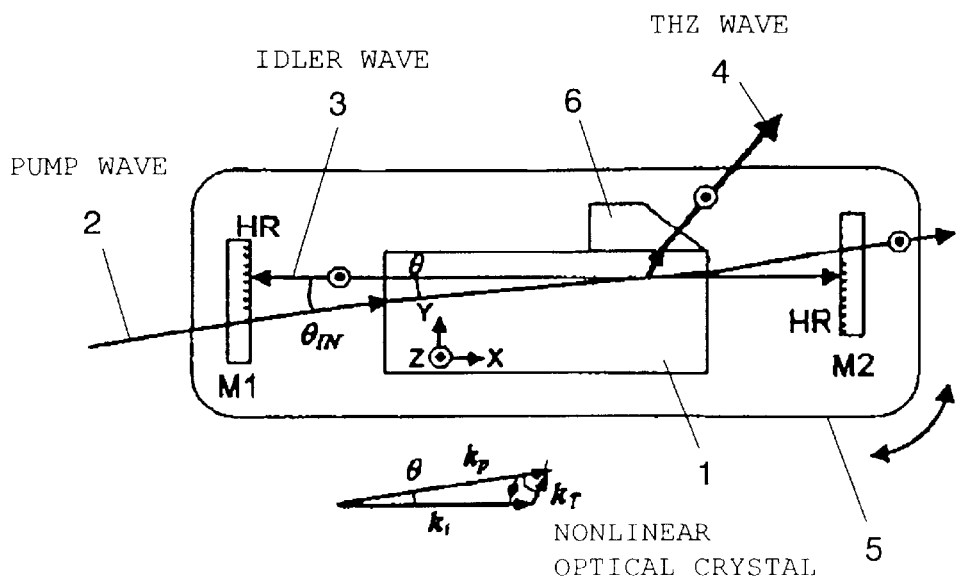
FIG. 2 is a configuration diagram of a prior art THz-wave generator having a resonator.

The following will describe embodiments of the present invention with reference to the drawings. In the figures, the common elements are indicated by the same reference numerals to avoid doubled explanation.

Figure 3:
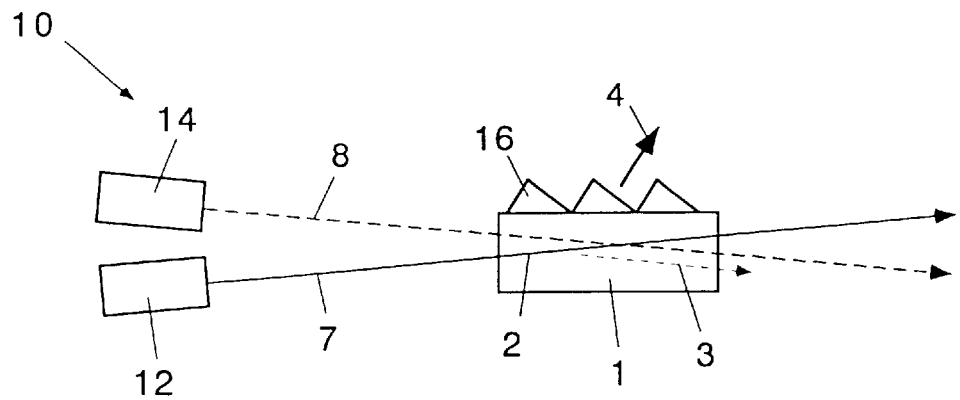
FIG. 3 is an illustration for showing a first embodiment of a THz-wave generator according to the present invention.

FIG. 3 is an illustration for showing a first embodiment of a THz-wave generator according to the present invention. As shown in it, a THz-wave generator 10 according to the present invention comprises a nonlinear optical crystal 1, a first laser device 12, and a second laser device 14.

The nonlinear optical crystal 1 is capable of parametric generation and may be made of, for example, $LiNbO_3$, or $MgO:LiNbO_3$ (MgO-doped $LiNbO_3$). Besides them, the material may be $LiTaO_3$, Nd-doped $LiNbO_3$, Nd-doped $LiTaO_3$, etc.

The first laser device 12 injects a first laser beam 7 of a single frequency as a pump wave 2 into the nonlinear optical crystal 1. This first laser device 12 may be, for example, a Qsw Nd:YAG laser of a single frequency and emits a pulse laser beam with a wavelength of 1064 nm and a width of 15 ns as the first laser beam 7. The power of this first laser beam 7 should preferably be higher, for example, 45 mJ/pulse.

The second laser device 14 injection-seeds a different second laser beam 8 of a single frequency in a direction in which an idler wave 3 is generated by the pump wave 2. This second laser device 14 may be, for example, a Yb fiber laser of a single frequency and emits a continuous laser beam with a wavelength of 1070.2 nm as a second laser beam 8. The power of this second laser beam 8 should preferably be higher, for example, about 250 mW.

The idler wave 3 generated by the pump wave 2 by parametric interaction is actually generated in a broad direction, so that an angle θ between the first laser beam 7 and the second laser beam 8 can be set in a range of about 0.5–3.0°, for example, at about 1.5° at the middle in the range.

The above-mentioned THz-wave generator by the first embodiment can be used according to a method of the present invention to thereby inject the single-frequency first laser beam 7 as the pump wave 2 into the nonlinear optical crystal 1 and also injection-seed the different single-frequency second laser beam 8 in a direction in which the idler wave 3 is generated, thus generating the idler wave 3 and a THz-wave 4 in such a direction that the non-collinear phase matching condition is satisfied.

Figure 7:
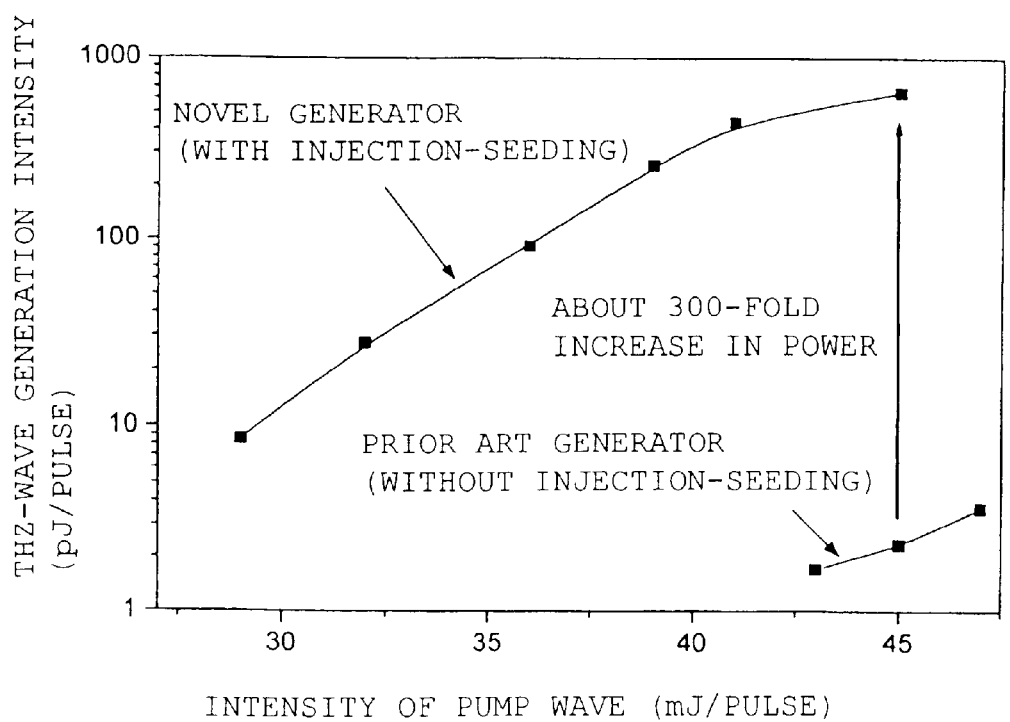
FIG. 7 is a graph for indicating a generation intensity of a THz-wave according to the example of the present invention.

According to the method and apparatus of the present invention, the different single-frequency second laser beam 8 is injection-seeded in the generation direction of the idler wave 3, thereby enabling generating an idler wave in a nonlinear optical crystal higher in intensity than the one generated only by the parametric interaction. This enhances the optical intensity of the idler wave 3 in this direction, thus greatly increasing the intensity of the THz-wave 4 as shown in FIG. 7.

Furthermore, the idler wave 3 enhanced by the second laser beam 8 has strong directivity and the first laser beam 7 and the second laser beam 8 are both a single-frequency laser beam, so that not only the directivity of the THz-wave generated is enhanced but also the spectrum width is greatly narrowed as shown in FIG. 8 explained later.

In the first embodiment shown in FIG. 3, the second laser device 14 is preferably of a tunable type, by which the wavelength of the second laser beam 8 used in injection-seeding can be changed. By using such tunable laser device to thereby change the wavelength of the second laser beam 8 to be injection-seeded, the wavelength of the THz-wave is changed.

Figure 9:
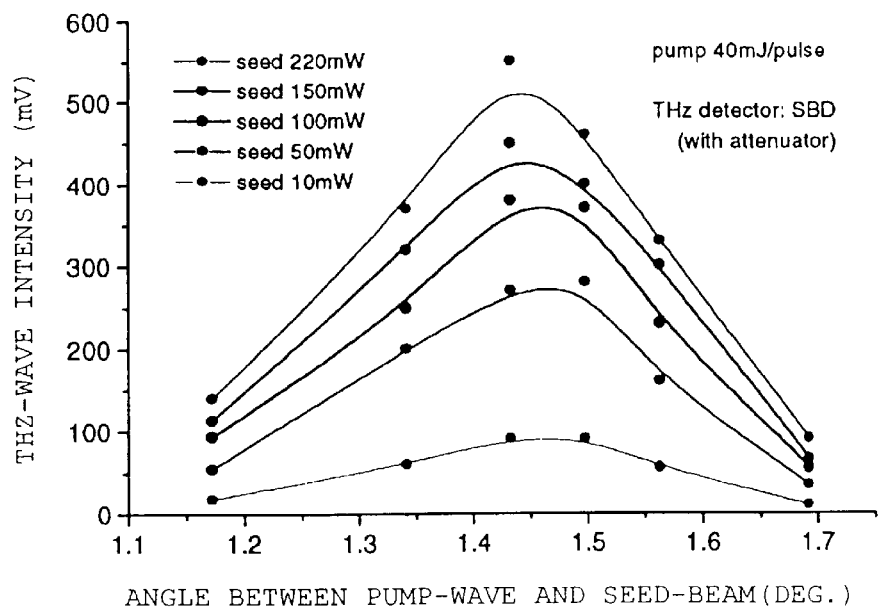
FIG. 9 is a graph for indicating a relation between a phase matching angle and a generation intensity of THz-wave.

According to this method and apparatus, as shown in FIG. 9 explained later, the power of the THz-wave is not sensitive to a change over a range of about 1.2° through about 1.7° in the angle θ between the first laser beam 7 and the second laser beam 8, so that conversely the wavelength of the THz-wave can be changed with this angle θ as fixed. Therefore, not only the mechanism can be simplified but also the measuring system employing a THz-wave can be adjusted easily.

In FIG. 3, the THz-wave generator 10 according to the present invention further comprises at least one prism coupler 16 (three in this example) arranged on the surface of the nonlinear optical crystal (on side of generating a THz-wave). This prism coupler 16 is made of such a material that has a small variation of refractive index in the THz-wave band.

The inventors confirmed by analysis in the above-mentioned reference (Reference 2) that by using silicon (Si) as the material of the prism coupler, even when the wavelength of the THz-wave is changed over a range of about 150–300 μm, the radiation angle of the generated THz-wave changes little. Therefore, by applying this method and configuration to the THz-wave generating means according to the present invention, it is possible to fix the generation direction of the THz-wave, thus simplifying the adjustment of the measuring system employing a THz-wave.

Figure 4A:
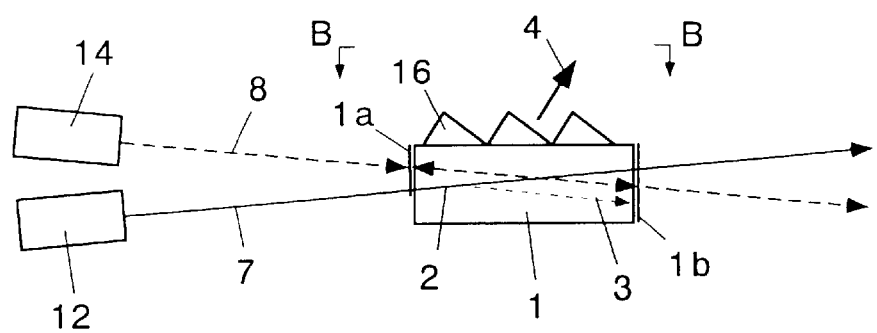
FIGS. 4A and 4B are illustrations for showing a second embodiment of the THz-wave generator according to the present invention.
Figure 4B:
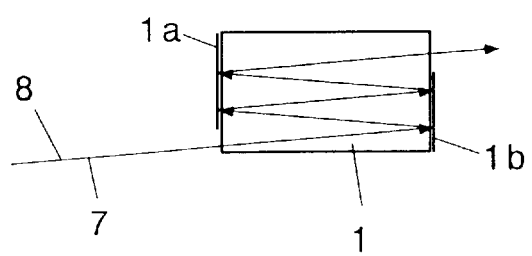

FIGS. 4A and 4B show a second embodiment of the THz-wave generator according to the present invention. Of these, FIG. 4A is a side view and FIG. 4B, a cross-sectional view taken along line B—B thereof. In this embodiment, the nonlinear optical crystal 1 has reflecting faces 1a and 1b at least partially on both surfaces. Those reflecting faces 1a and 1b are configured such that the first laser beam 7 and the second laser beam 8 may be reflected by them to thereby pass through in the same nonlinear optical crystal a plurality of times. Note here that in FIGS. 4A and 4B, although the reflecting faces 1a and 1b are shown as separated from the nonlinear optical crystal 1, high-reflection coating may be applied directly on an end face of the nonlinear optical crystal 1. The configuration is otherwise the same as that of the first embodiment.

According to this configuration, the first laser beam 7 and the second laser beam 8 can be reflected by the end face of the nonlinear optical crystal a plurality of times to thereby enhance the intensity of the power of the THz-wave.

Figure 6:
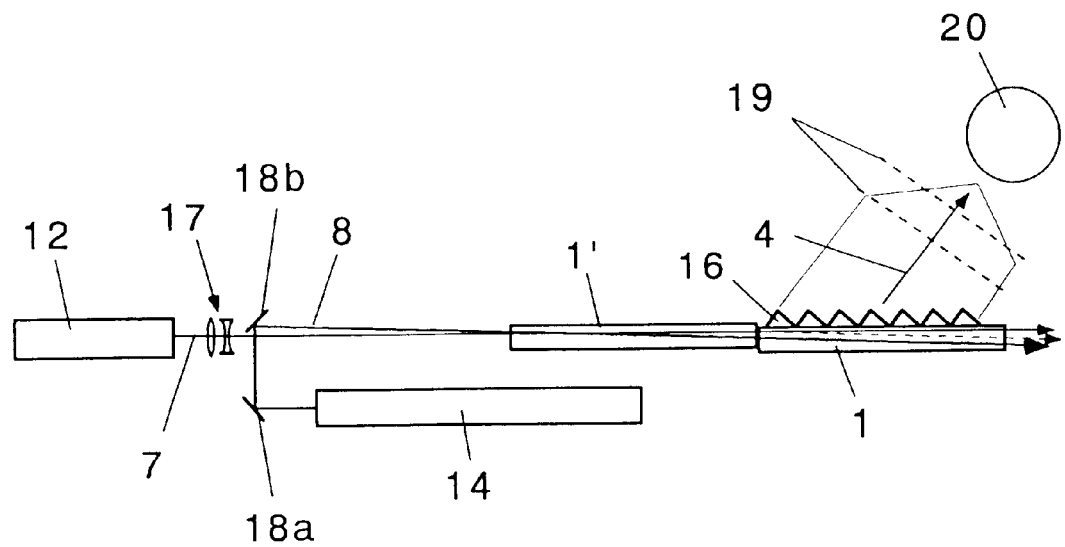
FIG. 6 is a configuration diagram for showing an example of the THz-wave generator according to the present invention.

According to this method and apparatus, the first laser beam 7 and the second laser beam 8 can be passed through in the same nonlinear optical crystal to thereby enhance the intensity of a generated THz-wave a plurality of times using a single nonlinear optical crystal rather than a plurality of nonlinear optical crystals as shown in FIG. 6 explained later.

Figure 5:
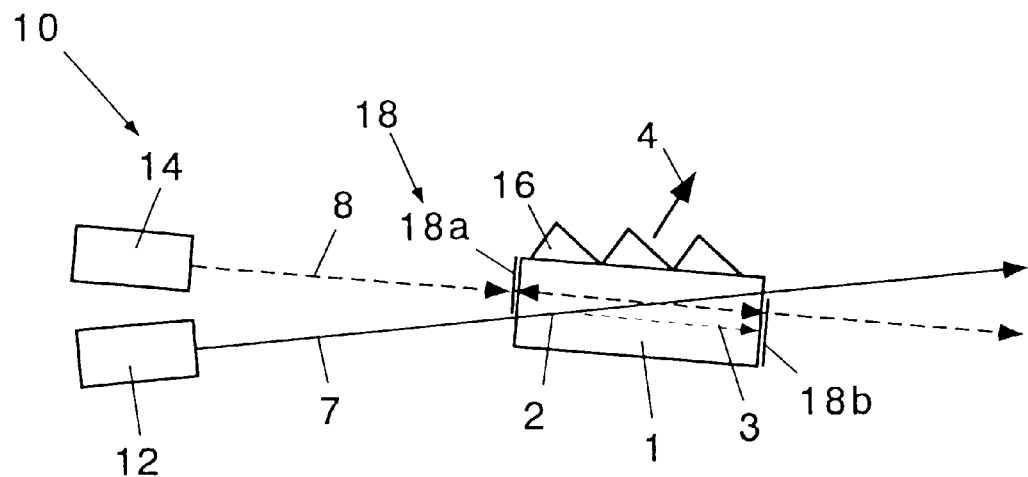
FIG. 5 is an illustration for showing a third embodiment of the THz-wave generator according to the present invention.

FIG. 5 shows a third embodiment of the THz-wave generator according to the present invention. In this embodiment, the THz-wave generator according to the present invention comprises a resonator 18. This resonator 18 is comprised of one pair of mirrors 18a and 18b to which high-reflection coating is applied, for amplifying the idler wave 3.

According to this configuration, simplicity of using no resonator is lost but the mirrors 18a and 18b of the resonator 18 can further enhance the intensity of the idler wave 3, thus further increasing the intensity of a generated THz-wave.

EXAMPLES

FIG. 6 is a configuration diagram for showing an example of the THz-wave generator according to the present invention. In this figure, reference numerals 1 and 1' indicates a nonlinear optical crystal, a reference numeral 17 indicates a telescope (lens system), reference numerals 18a and 18b indicate a mirror, a reference numeral 19 indicates a metal mesh etalon, and a reference numeral 20 indicates bolometer.

In this example, the nonlinear optical crystal 1 of a MgO:LiNbo$_3$ crystal (length: 65 mm) and the nonlinear optical crystal 1' of a LiNbO$_3$ crystal (length: 65 mm) were arranged series to thereby take out the THz-wave 4 from the Si prism array 16. Those two nonlinear optical crystals 1 and 1' were thus arranged series in order to enhance the effect of the nonlinear optical crystal.

The pump wave 7 is a beam of the single frequency Qsw Nd:YAG laser 12 (wavelength: 1064 nm, pulse width: 15 ns), while a seed light 8 of the idler wave is a beam of the single frequency Yb fiber laser 14 (wavelength: 1070 nm, continuous wave) and was injected at a phase matching angle of 1.5°.

The THz-wave 4 was detected using a Schottky barrier diode and a Si bolometer 20 along with two sheets of cover glass (not shown) for attenuation of the THz-wave.

The wavelength of the idler wave generated in this example agreed with that of an injected seed. Moreover, the wavelength of the THz-wave 4 was 184 μm. The metal mesh etalon spacing was expanded to 200 mm (FSR750 MHz) to measure a THz-wave line width of 230 MHz. A THz-wave intensity of 0.9 nJ/pulse (peak value: 260 mW, pulse width: 3.4 ns) was obtained for a pump wave intensity of 45 mJ/pulse (oscillation threshold: 29 mJ/pulse) and an injected seed intensity of 250 mW. This value greatly exceeds the conventional maximum power of 0.19 nJ/pulse (peak value: 19 mW) obtained through TPO. It was confirmed that when the seed light (second laser beam 8) was blocked, the intensity of the THz-wave 4 was reduced to about one 300'th.

Based on this example, it was confirmed that by introducing a method of injection-seeding the idler wave into the process of THz parametric generation (TPG) using no resonator, it is possible to narrow the THz-wave to almost a Fourier transform limit and also to greatly increase the radiation intensity.

FIG. 7 is a graph for indicating an intensity of a generated THz-wave in this example of the present invention. In this graph, its horizontal axis represents the intensity of a pump wave, its vertical axis represents the intensity of a THz-wave, the upper line represents data of the example of the present invention, and the lower line represents data of an example of the prior art example. This prior art example is of a single-path arrangement, in comparison to which about a 300-fold increase in power was observed. This power greatly exceeds a value obtained in a case where a resonator is used.

Figure 8A:
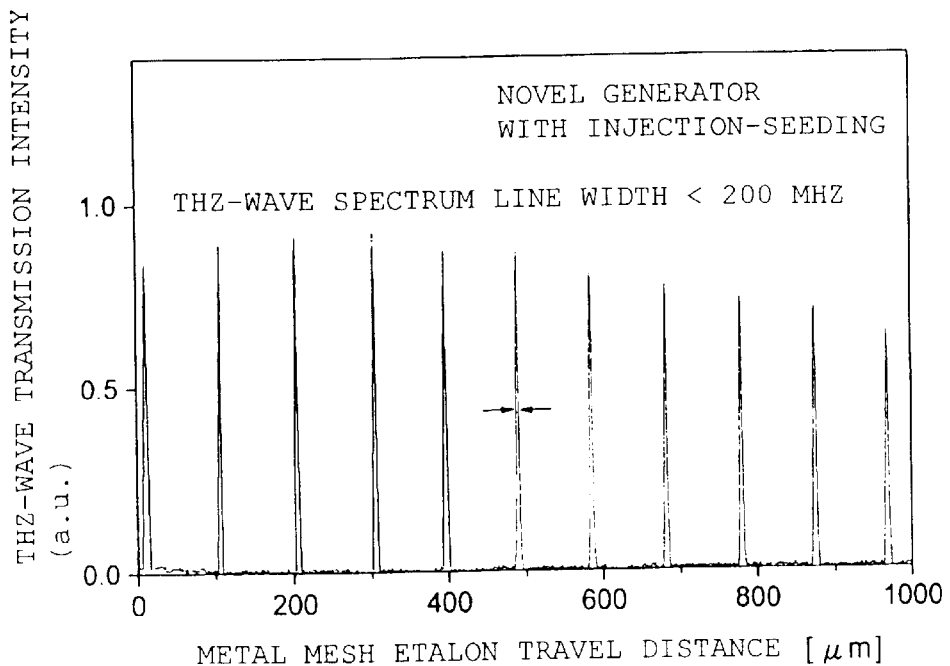
FIGS. 8A and 8B are graphs for indicating a spectrum width of a THz-wave according to the example of the present invention.
Figure 8B:
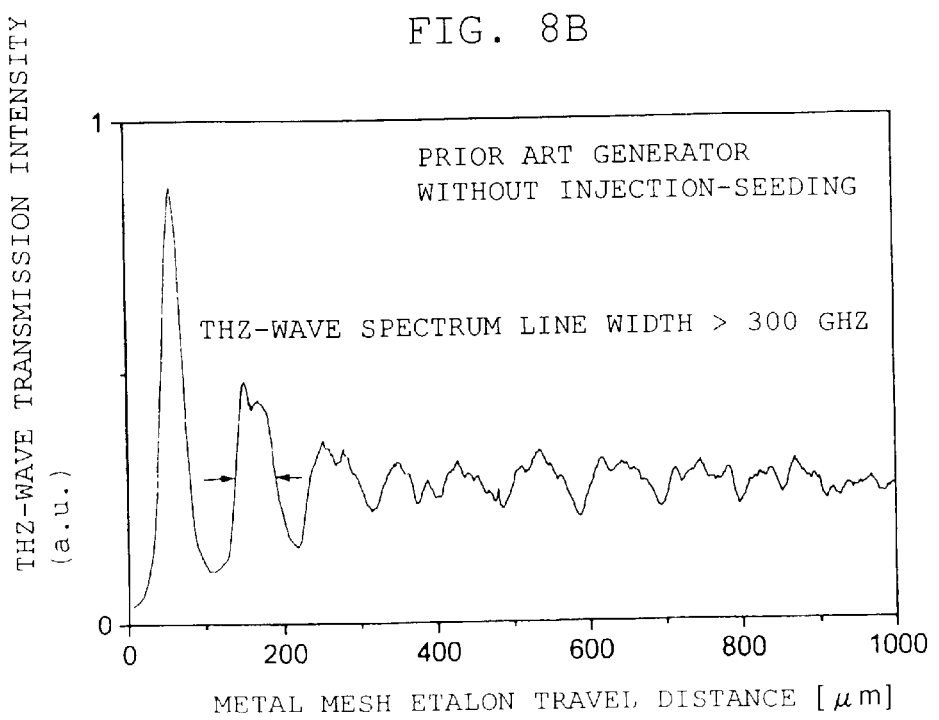

FIGS. 8A and 8B are graphs for indicating a spectrum width of a THz-wave in the example of the present invention. Of these, FIG. 8A indicates the value by the present invention example and FIG. 8B, the value by the prior art example. As apparent from comparison between them, by the method and apparatus according to the present invention, the spectrum width was greatly narrowed. In addition, although not apparent from these figures, the line width of a THz-wave generated by the present invention was confirmed to be an excellent value close to a Fourier transform limit determined by the pulse width.

FIG. 9 is a graph for indicating a relation between a seed incident angle and an intensity of a generated THz-wave. As shown in it, even when an angle θ between the first laser beam 7 and the second laser beam 8 is changed over a range of about 1.2° to about 1.7°, the power of the THz-wave is not sensitive to this change. Therefore, it is known that conversely by changing the wavelength of the second laser beam 8 to be injection-seeded with this angle θ as fixed, the wavelength of the THz-wave can be changed.

Figure 10:
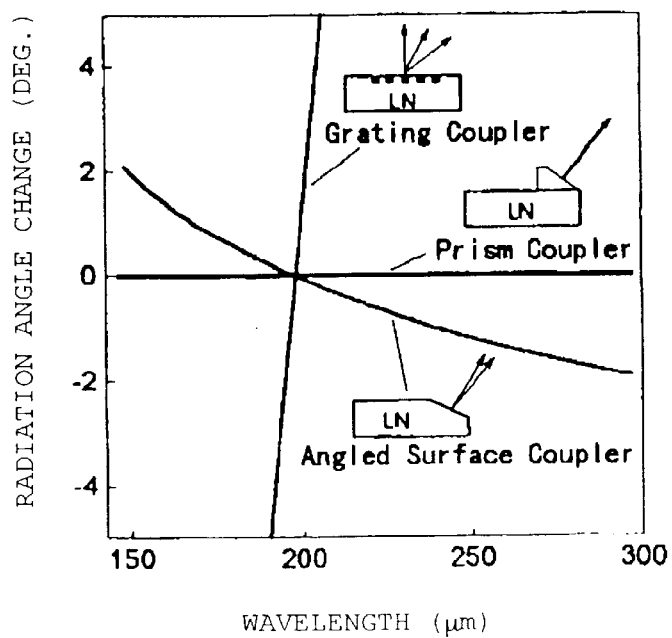
FIG. 10 is a graph for indicating a relation between a wavelength and a generation direction of a THz-wave.

FIG. 10 is a graph for indicating a relation between a wavelength of a THz-wave analyzed in Reference 2 and a direction in which it was generated. It is apparent that when silicon (Si) is used as the material of the prism coupler 16, even if the wavelength of the THz-wave is changed over a range of 150–300 μm, the radiation angle of the generated THz-wave changed little. The subsequent strict analysis showed a little change. Therefore, it is apparent that by incorporating this configuration to the THz-wave generating means by the present invention, the generation direction of the THz-wave can be made almost constant.

As described above, by the present invention, a single-frequency laser beam is used to excite a nonlinear optical crystal and also a single-frequency laser beam is injection-seeded into a stokes beam (idler wave) generated at the same time as a THz-wave.

The prior art THz-wave generator by use of parametric generation under a non-collinear phase matching condition in a nonlinear optical crystal has a practical disadvantage that the spectrum width of a generated THz-wave is large and its power is low, whereas the present invention narrows the spectrum width of the THz-wave down to about one several hundredth and increases its power several hundred times as compared to the prior art value.

Furthermore, by changing only the wavelength of a injection-seeded beam with its incident angle as unchanged, the tunability of the THz-wave can be obtained.

Furthermore, it is possible to increase the conversion efficiency by reciprocating a beam in a crystal a plurality of times.

Therefore, the method and apparatus of the present invention for generating a THz-wave has such an excellent effect that in generation of THz-wave by use of parametric generation under a non-collinear phase matching condition in a nonlinear optical crystal, the power of the generated THz-wave can be increased greatly, its spectrum width can be narrowed further, its wavelength can be made variable, and its generation direction can be held almost constant.

Of course, the present invention is not limited to the above-mentioned embodiments but can be modified variously within a gist thereof.

What is claimed is:

1. A THz-wave generating method for injecting a pump wave (2) into a nonlinear optical crystal (1) capable of generating a THz-wave using the parametric effect to thereby generate an idler wave (3) and a THz-wave (4) in such a direction as to satisfy the non-collinear phase matching condition, wherein:

a single-frequency first laser beam (7) is used as said pump wave and also a different single-frequency second laser beam (8) is injection-seeded in a direction in which said idler wave is generated.

2. The THz-wave generating method according to claim 1, wherein a wavelength of said second laser beam (8) to be injection-seeded is changed to change a wavelength of a THz-wave generated.

3. The THz-wave generating method according to claim 1, wherein at least one prism coupler (16) made of a material having a small variation of refractive index in a THz-wave band is arranged on said nonlinear optical crystal to thereby reduce a change in a radiation angle which accompanies a change in a wavelength of a THz-wave generated.

4. The THz-wave generating method according to claim 1, wherein said first laser beam (7) and said second laser beam (8) are reflected at one end face or both end faces of said nonlinear optical crystal and thereby reciprocated therein a plurality of times, thus enhancing a power intensity of a THz-wave generated.

5. A THz-wave generator comprising:
   a nonlinear optical crystal (1) capable of generating a THz-wave using the parametric effect;
   a first laser device (12) for injecting a single-frequency first laser beam (7) as a pump wave (2) into said nonlinear optical crystal; and
   a second laser device (14) for injection-seeding a different single-frequency second laser beam (8) in a direction in which an idler wave is generated by a pump wave.

6. The THz-wave generator according to claim 5, wherein said second laser device (14) is of a tunable type, by which a wavelength of said second laser beam (8) to be injection-seeded can be changed.

7. The THz-wave generator according to claim 5, comprising at least one prism coupler (16) arranged on said nonlinear optical crystal, wherein said prism coupler is made of a material having a small variation of refractive index in a THz-wave band.

8. The THz-wave generator according to claim 5, wherein said nonlinear optical crystal has reflecting faces (1a, 1b) at least partially on both surfaces thereof, in such a configuration that at said reflecting faces said first laser beam (7) and said second laser beam (8) are reflected and thereby reciprocated in said nonlinear optical crystal a plurality of times.

9. The THz-wave generator according to claim 5, comprising a resonator (18) comprised of one pair of mirrors (18a, 18b) to which high-reflection coating is applied, for amplifying an idler wave (3).

* * * * *

UNITED STATES PATENT AND TRADEMARK OFFICE
CERTIFICATE OF CORRECTION

PATENT NO. : 6,697,186 B2
DATED : February 24, 2004
INVENTOR(S) : Kodo Kawase et al.

It is certified that error appears in the above-identified patent and that said Letters Patent is hereby corrected as shown below:

<u>Title page,</u>
Item [75], Inventors, "Koda" should read -- Kodo --

Signed and Sealed this

Nineteenth Day of October, 2004

JON W. DUDAS
*Director of the United States Patent and Trademark Office*